United States Patent
Chang

(10) Patent No.: US 7,306,341 B2
(45) Date of Patent: Dec. 11, 2007

(54) MULTI-PROJECTOR GEOMETRIC CALIBRATION

(75) Inventor: Nelson Liang An Chang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 293 days.

(21) Appl. No.: 11/068,195

(22) Filed: Feb. 28, 2005

(65) Prior Publication Data

US 2006/0192925 A1   Aug. 31, 2006

(51) Int. Cl.
    *G03B 21/26* (2006.01)
    *G03B 21/00* (2006.01)
    *G01B 11/24* (2006.01)
    *G01B 11/30* (2006.01)
    *G01B 9/08* (2006.01)
(52) U.S. Cl. ............... 353/94; 353/5; 353/11; 353/30; 356/603; 356/391
(58) Field of Classification Search .............. 353/94, 353/5, 11, 30; 356/603, 391
    See application file for complete search history.

(56) References Cited

U.S. PATENT DOCUMENTS

| 5,613,048 | A   | 3/1997  | Chen et al.      |         |
|-----------|-----|---------|------------------|---------|
| 6,369,879 | B1  | 4/2002  | Pedersen         |         |
| 6,618,076 | B1  | 9/2003  | Sukthankar et al.|         |
| 6,755,537 | B1  | 6/2004  | Raskar et al.    |         |
| 6,804,406 | B1* | 10/2004 | Chen             | 382/254 |
| 2004/0151365 | A1* | 8/2004 | An Chang et al. | 382/154 |
| 2004/0222987 | A1* | 11/2004 | Chang et al.   | 345/419 |

OTHER PUBLICATIONS

D. Scharstein and R. Szeliski, "High Accuracy Stereo Depth Maps using Structured Light," CVPR'03 (Jun. 2003).
R. Yang, A. Majumder, and M. S. Brown, "Camera Based Calibration Techniques for Seamless Flexible Multi-Projector Displays," ECCV'04 (May 16, 2004).
C. Jaynes and D. Ramakrishnan, "Super-Resolution Composition in Multi-Projector Displays," PROCAMS'03 (Oct. 2003).
R. Raskar et al., "Multi-Projector Displays using Camera-Based Registration,"Visualization'99 (Oct. 1999).

* cited by examiner

*Primary Examiner*—Diane I. Lee
*Assistant Examiner*—Magda Cruz

(57) ABSTRACT

In one aspect, a first sequence of patterns of light symbols that spatio-temporally encode two-dimensional position information in a first projection plane is projected onto a scene. A second sequence of patterns of light symbols that spatio-temporally encode two-dimensional position information in a second projection plane is projected onto the scene. Light patterns corresponding to the first and second sequences of patterns of light symbols reflected from the scene are captured at a capture plane. Captured light symbol sequence codes are determined from the captured light patterns. A correspondence mapping of the first projector plane and the second projector plane with respect to a reference coordinate system is generated based at least in part on correspondence between the captured light symbol sequence codes and the first and second sequences of light symbol patterns.

26 Claims, 6 Drawing Sheets

MULTI-PROJECTOR GEOMETRIC CALIBRATION

BACKGROUND

Recent advances in light projection technology and computer hardware are enabling the construction of large-format, high-resolution projector-based displays from groups of commodity light projectors and computers. These multi-projector displays create composite images on a display area from contributing images that are projected by the constituent projectors along different optical paths. In general, any overlap between the contributing images should be seamless in the composite images. To this end, the projectors of a multi-projector system are geometrically calibrated (or registered) to correct geometric misalignments across the projectors.

Various techniques have been developed for geometrically calibrating the projectors of multi-projector displays. In some geometric calibration approaches, one or more cameras provide feedback data relating to the images that are projected by the different projectors and projector calibration data is computed from the camera feedback data. The images projected by the projectors are geometrically aligned in accordance with the projector calibration data to generate seamless composite images.

In some approaches for calibrating multi-projector displays, correspondences across the different projectors are established manually or through the use of passive fiducial marks or through actively projecting detectable features (e.g., points or blobs). In other approaches, the geometric arrangement of the projectors and one or more cameras is precalibrated to derive a Euclidean frame of reference. Feedback from the one or more cameras is mapped onto the Euclidean frame of reference to generate a three-dimensional model in which the arrangement of the projectors, the one or more cameras, and the display area are expressed within a single three-dimensional coordinate system (i.e., a world coordinate system). The three-dimensional model is used to prewarp the contributing images so that the projected images appear geometrically registered and undistorted on the display area.

SUMMARY

In one aspect, the invention features a method of multi-projector correspondence mapping. In accordance with this inventive method, a first sequence of patterns of light symbols that spatio-temporally encode two-dimensional position information in a first projection plane is projected onto a scene. A second sequence of patterns of light symbols that spatio-temporally encode two-dimensional position information in a second projection plane is projected onto the scene. Light patterns corresponding to the first and second sequences of patterns of light symbols reflected from the scene are captured at a capture plane. Captured light symbol sequence codes are determined from the captured light patterns. A correspondence mapping of the first projector plane and the second projector plane with respect to a reference coordinate system is generated based at least in part on correspondence between the captured light symbol sequence codes and the first and second sequences of light symbol patterns.

The invention also features a machine-readable medium storing machine-readable instructions for causing a machine to perform operations for implementing the above-described method and a multi-projector system for implementing the above-described method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The embodiments that are described in detail below include at least one camera, at least two projectors, and at least one processing unit that enable automatic determination of a geometric mapping between a reference coordinate system and every projector in a multi-projector system in a robust and efficient way. The reference coordinate system may be located in the projection plane of one of the projectors, the capture plane of the camera, or it may be a virtual reference coordinate system. In some implementations, these embodiments determine a direct mapping between a reference projector and each of the other projectors in a multi-projector system. In other implementations, these embodiments first determine an intermediate mapping between the capture plane of the camera and each projector in the multi-projector system and then transform the mapping to the reference projector's coordinate system. In other implementations, the computed mapping may be further transformed to a virtual reference coordinate system. The geometric calibration approach that is incorporated in these embodiments is flexible and does not require precalibration of the components of a multi-projector system. In addition, the computational requirements of this approach scale linearly with the number of projectors. In some implementations, a visibility mask for all points seen by the projectors is generated, enabling automatic detection of the overlap regions of the projected images.

Figure 1:
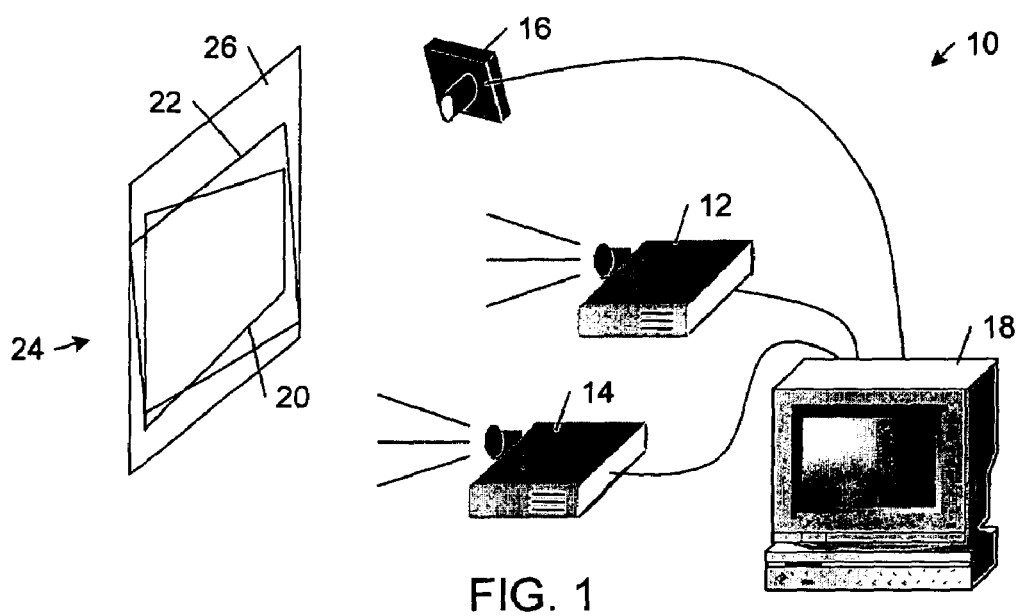
FIG. 1 is a diagrammatic view of an embodiment of a multi-projector system that includes two projectors, a camera, and a computer.

FIG. 1 shows an embodiment of a multi-projector system 10 that includes two projectors 12, 14, a camera 16, and a computer 18. In operation, the projectors 12, 14 project images 20, 22 onto a scene 24 and the camera 16 captures images reflected from the scene 24. In the illustrated embodiment, the scene is a planar surface 26. In general, however, the scene 24 may contain one or more of any type of objects and surfaces.

Figure 2:
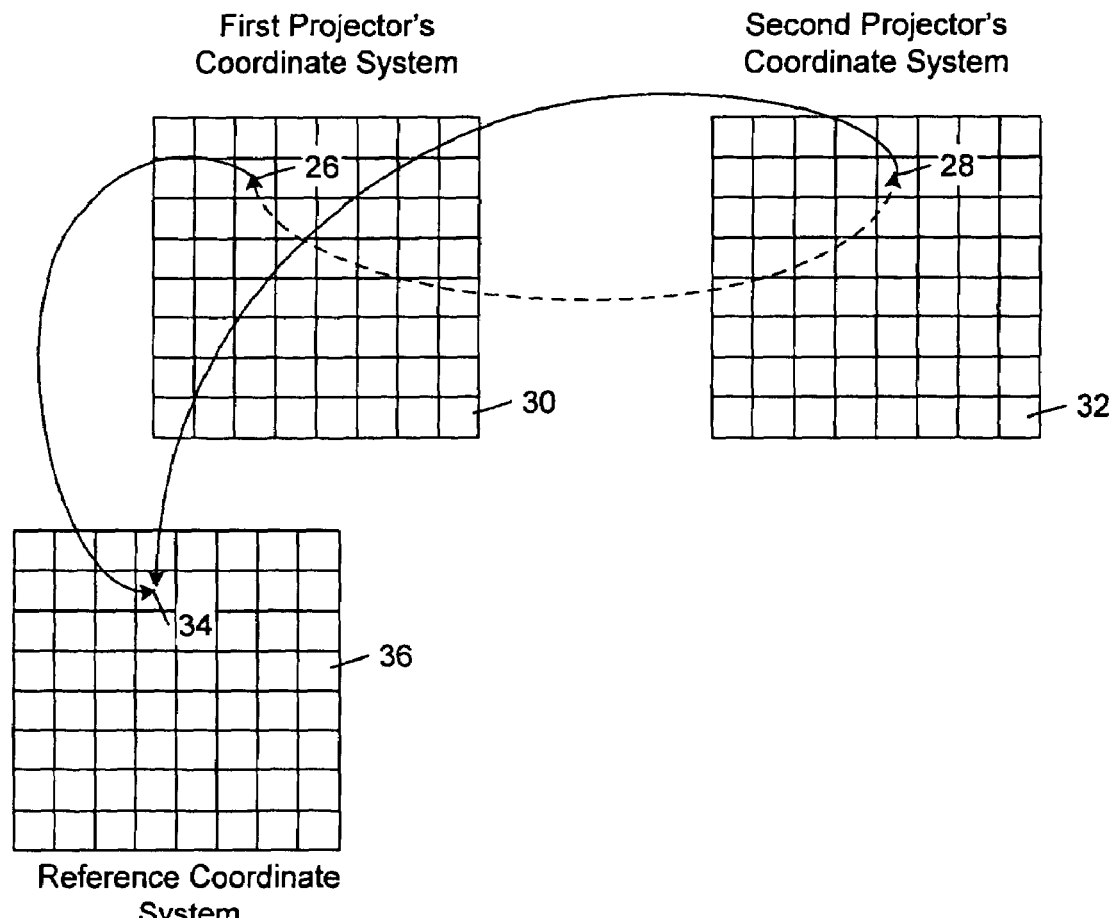
FIG. 2 is a diagrammatic view of correspondence mappings between the coordinate systems of the two projectors shown in FIG. 1 and between each of the projector coordinate systems and a reference coordinate system.

The computer 18 coordinates the operation of the projectors 12, 14 and the camera 16. During a geometric calibration phase of operation, the computer 18 controls the projectors 12, 14 and the camera 16 to obtain image data from which a correspondence mapping of the projection planes of the projectors 12, 14 with respect to a reference coordinate system is generated. For example, as shown in FIG. 2, in some implementations, the computer 18 maps regions (or pixels) 26, 28 in coordinate systems 30, 32 in the projection planes of each of the projectors 12, 14 to a corresponding region 34 in a reference coordinate system 36. In general, each coordinate system 30, 32, 36 is defined by a rectangular grid with w×h connected rectangular regions, where w and h are width and height dimensions of the grid. Based on these correspondences, the computer 18 determines the direct correspondences between the coordinate systems 30, 32 of the projectors 12, 14. This information may be used by the computer 18 to geometrically calibrate the projectors 12, 14 to produce, for example, seamless composite images on the scene 24.

The projectors 12, 14 may be implemented by a wide variety of different light sources. Exemplary light sources include strongly colored incandescent light projectors with vertical slit filters, laser beam apparatus with spinning mirrors, and computer-controlled light projectors (e.g., LCD-based projectors or DLP-based projectors). In the illustrated embodiments, the light projectors 12, 14 are computer-controlled light projectors that allow the projected light patterns to be dynamically altered using software. In some embodiments, the projectors 12, 14 and the camera 16 operate in the visible portion of the electromagnetic spectrum. In other embodiments, the projectors 12, 14 and the camera 16 operate in other regions (e.g., infrared or ultraviolet regions) of the electromagnetic spectrum. As explained in detail below, the actual location of the projectors 12, 14 with respect to the camera 16 need not be estimated in order to generate a correspondence mapping of the projection planes 30, 32 of the projectors 12, 14 with respect to the reference coordinate system 36.

In general, the camera 16 may be any type of imaging device, including a computer-controllable digital camera (e.g., a Kodak DCS760 camera), a USB video camera, and a Firewire/1394 camera. USB video cameras or "webcams," such as the Intel PC Pro, generally capture images 30 fps (frames per second) at 320×240 resolution, while Firewire cameras (e.g., Point Grey Research Dragonfly) can capture at higher frame rates and/or resolutions. The camera 16 typically remains fixed in place and is oriented toward the scene 24.

The illustrated embodiments include a single camera 16. In other embodiments, however, the multi-projector system 10 may include more than one imaging device for monitoring the images that are projected onto the scene 24 and providing feedback to the computer 18. In these embodiments, multiple cameras capture respective sets of projected light patterns. In some implementations, the results from all cameras are remapped to a common reference coordinate system and stitched together to form a higher resolution panorama of sorts. The resulting higher resolution (or super-resolution) image may be used to generate the multi-projector mappings described herein. In some implementations, multiple cameras may be required when a single camera's resolution is insufficient to capture the projected results (e.g., when images are projected onto a very large display area).

The computer 18 may be any type of personal computer, portable computer, or workstation computer that includes a processing unit, a system memory, and a system bus that couples the processing unit to the various components of the computer. The processing unit may include one or more processors, each of which may be in the form of any one of various commercially available processors. Generally, each processor receives instructions and data from a read-only memory and/or a random access memory. The system memory typically includes a read only memory (ROM) that stores a basic input/output system (BIOS) that contains start-up routines for the computer, and a random access memory (RAM). The system bus may be a memory bus, a peripheral bus or a local bus, and may be compatible with any of a variety of bus protocols, including PCI, VESA, Microchannel, ISA, and EISA. The computer 18 also may include a hard drive, a floppy drive, and CD ROM drive that are connected to the system bus by respective interfaces. The hard drive, floppy drive, and CD ROM drive contain respective computer-readable media disks that provide non-volatile or persistent storage for data, data structures and computer-executable instructions. Other computer-readable storage devices (e.g., magnetic tape drives, flash memory devices, and digital video disks) also may be used with the computer. A user may interact (e.g., enter commands or data) with the computer 18 using a keyboard and a pointing device. Information may be displayed to the user on a monitor or with other display technologies. In some embodiments, the computer 18 also may consist of one or more graphics cards, each of which is capable of driving one or more display outputs that are synchronized to an internal or external clock source.

Figure 3:
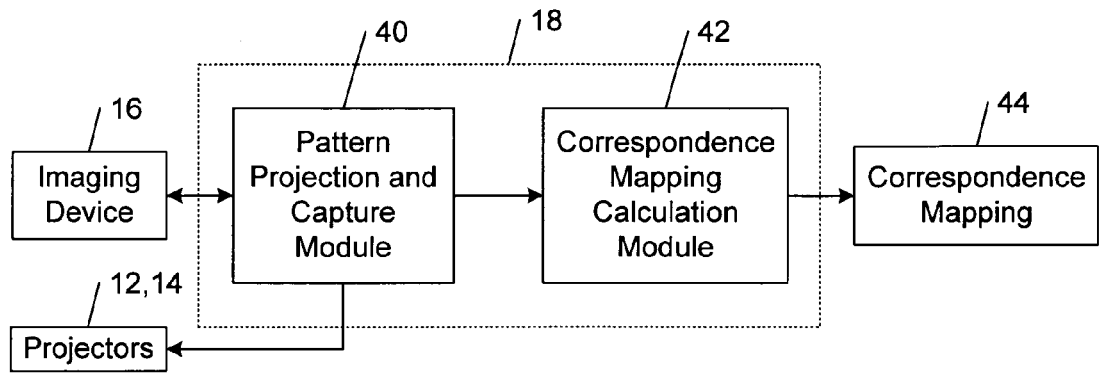
FIG. 3 is a block diagram of an implementation of the multi-projector system embodiment shown in FIG. 1.

FIG. 3 shows an implementation of the multi-projector system 10 in which the computer 18 includes a pattern projection and capture module 40 and a correspondence mapping calculation module 42. In operation, the pattern projection and capture module 40 choreographs the projection of light onto the scene 24 by the projectors 12, 14 and the capture of light reflected from the scene 24 by the camera 16 to ensure proper synchronization. Based at least in part on the captured light, the correspondence mapping calculation module 42 computes a correspondence mapping 44 of the first and second projector planes 30, 32 with respect to the reference coordinate system 36. In general, the modules 40, 42 may be implemented in any computing or processing environment, including in digital electronic circuitry or in computer hardware, firmware, or software. In the illustrated embodiments, the pattern projection and capture module 40 and the correspondence mapping calculation module 42 are implemented by one or more respective software modules that are executed on the computer 18.

Figure 4:
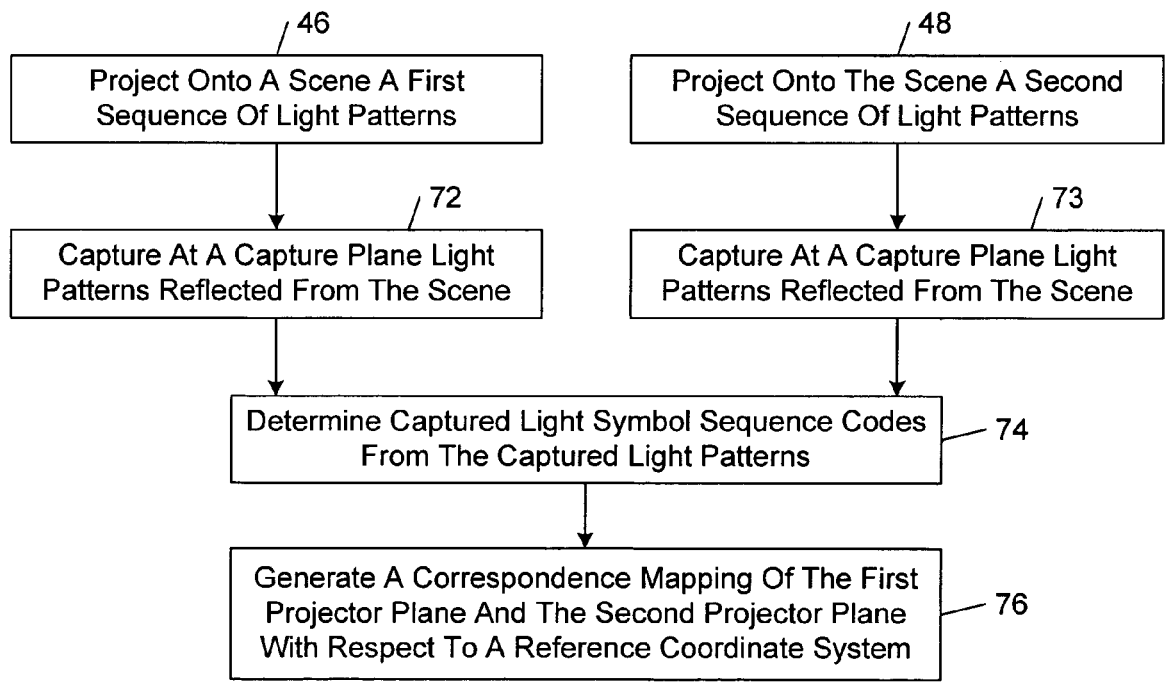
FIG. 4 is a flow diagram of an embodiment of a method of generating a correspondence mapping.

FIG. 4 shows an embodiment of a method by which the multi-projector system 10 generates the correspondence mapping 44 of the first and second projectors' coordinate systems 30, 32 with respect to the reference coordinate system 36

During the geometric calibration phase of operation, the computer 18 controls the projectors 12, 14 to project respective sequences of patterns of light symbols that encode in space and/or time two-dimensional position information in the coordinate systems 30, 32 in the projection planes of the projectors 12, 14 (blocks 46, 48). In general, any type of coding approach that assigns a unique spatio-temporal identifier to every region in each projector's coordinate system 30, 32 may be used. The correspondence mapping is determined by decoding the temporal sequence of light symbols that are captured by the camera 16. In some embodiments, horizontally and vertically oriented binary-colored light patterns are projected onto the scene 24 by each of the projectors 12, 14. The computer 18 is operable to generate the correspondence mapping 44 without information about the exact locations of the projectors 12, 14 and without information about camera calibration parameters that might be derived from a pre-calibration setup process. Instead of solving for 3-D structure, these embodiments address the correspondence problem by using the light patterns to pinpoint the exact locations of the coordinates in the projection planes 30, 32 that map to the capture plane of the camera 16. Furthermore, in the illustrated embodiments, the decoded binary sequence at every image pixel in the capture plane identifies the location in the projection planes 30, 32 directly; no additional computation or searching is required.

Figure 5A:
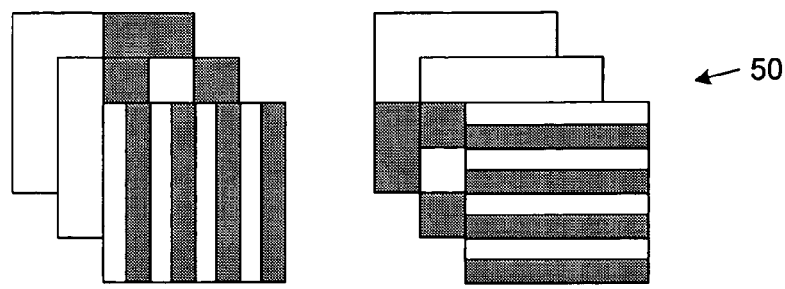
FIG. 5A is a diagrammatic view of an embodiment of a set of multiresolution light patterns.
Figure 5B:
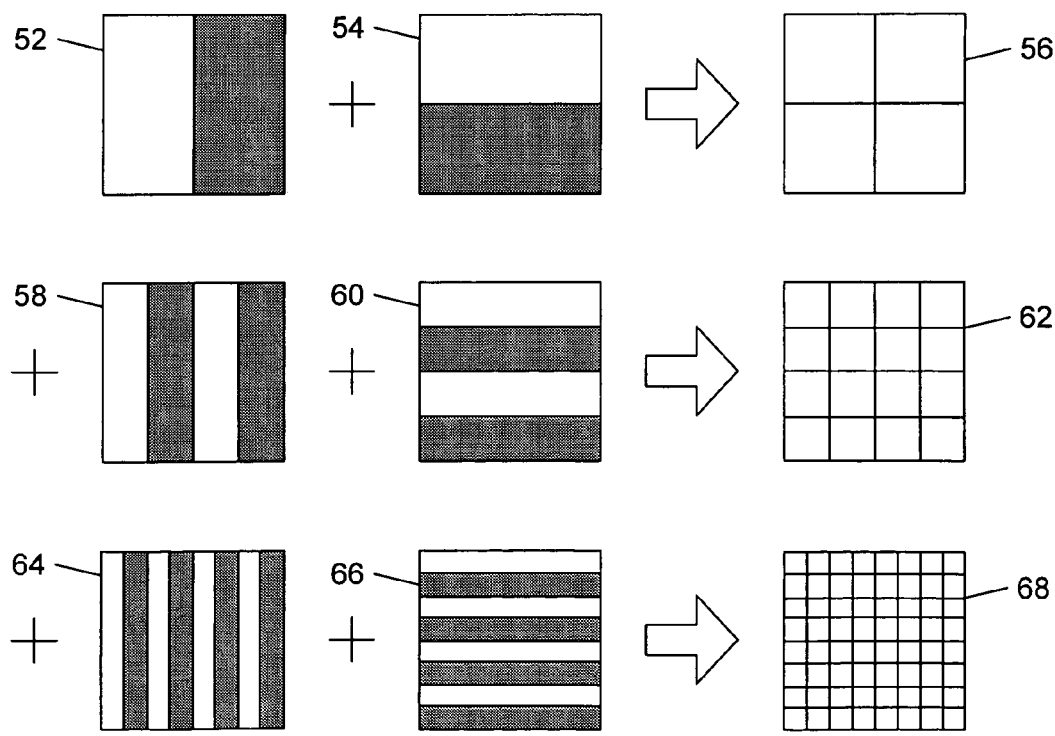
FIG. 5B shows a sequence of the light patterns shown in FIG. 5A that spatio-temporally encodes two-dimensional position information at different resolution levels.

Referring to FIGS. 5A and 5B, in one illustrative example, each projection plane coordinate system 30, 32 is an 8×8 grid 68, where the lower right corner is assigned (row, column)=(0,0)=(000,000), which corresponds to a sequence of all dark light symbols, and the upper left corner is assigned (row,column)=(7,7)=(111,111), which corresponds to a sequence of all bright light symbols. In some implementations, each projection plane coordinate system is a 1024×768 grid. The six light patterns 50 are able to encode all of the sixty-four grid (or coordinate) positions. As shown in FIG. 5B, the coded light symbol patterns 50 exhibit a natural hierarchical spatial resolution ordering that dictates the size of the projection plane rectangles. In the illustrated example, the light symbol patterns 50 are ordered from coarse to fine, and each associated pair of vertical-horizontal patterns at the same scale subdivides the projection plane by two in both directions. Using the coarsest two patterns 52, 54 alone results in only a 2×2 projection plane coordinate system 56. Adding the next pair of patterns 58, 60 increases the projection plane grid 62 to 4×4, with every rectangle's area reduced by a fourth, and likewise for the third pair of patterns 64, 66. All six patterns 50 encode the 8×8 projection plane grid 68.

In operation, each of the projectors 12, 14 projects each of the patterns 50 onto the scene 24 in succession. In some embodiments, the sequences of light symbol patterns 50 are projected by the projectors 12, 14 consecutively. In other embodiments, the sequences of light symbol patterns 50 are projected by the projectors 12, 14 concurrently. For example, in one of these embodiments, each projector 12, 14 projects the light patterns 50 in a different color channel so that the computer 18 can separate the reflected light corresponding to the two projectors 12, 14 by color but can be simultaneously captured by the camera 16. In another embodiment, each projector 12, 14 projects the light patterns 50 with a different polarization so that the camera 16 can separate the reflected light corresponding to the two projectors using polarization filters.

Figure 6:
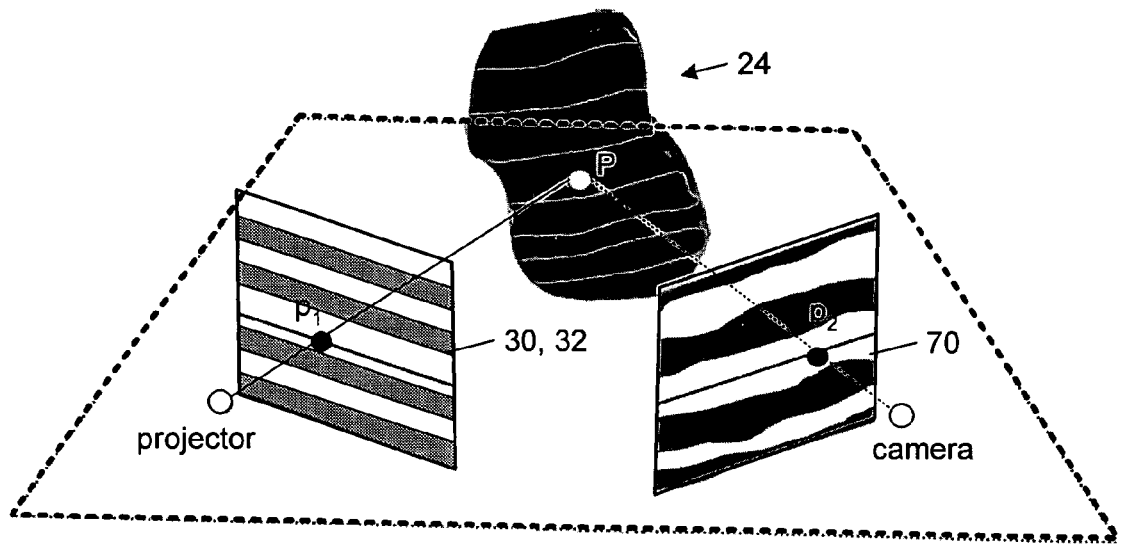
FIG. 6 is a diagrammatic view of an embodiment of a light symbol pattern that is projected from a projection plane onto an object and the corresponding light pattern that is reflected from the object and captured at a capture plane.

Referring back to FIG. 4 and to FIG. 6, the computer 18 controls the camera 16 to capture light patterns that are reflected from the scene 24 at a capture plane 70 (blocks 72, 73). The capture of images by the camera 16 typically is synchronized with the projection of light symbol patterns 50 by the projectors 12, 14.

In some implementations, a validity map is determined for each projector 12, 14 and the camera 16. In this regard, for every pixel p in the camera 16, $V_k(p)=1$ when the inter-symbol distance (e.g., the $l_2$ norm of the difference of every pair of mean color vectors) is below a preset threshold. The invalid pixels correspond to points that lie outside the projected space or that do not offer enough discrimination between the projected symbols (e.g., regions of black in the scene 24 absorb the light).

After the reflected light patterns have been captured (blocks 72, 73), the computer 18 determines captured light symbol sequence codes from the captured light patterns (block 74). In this process, the computer 18 determines the sequence of light symbols and builds up bit sequences at every pixel location in the capture plane 70. Points with the same temporal sequence of light symbols are grouped into clusters. The computer 18 warps these clusters to corresponding (row,column) coordinate locations in the appropriate projection plane 30, 32 based on the captured light symbol sequence codes. In this process, the computer 18 decodes the first three light symbols in the sequence into row coordinates and the last three light symbols in the sequence into column coordinates. For example, if point $p_2$ in the capture plane 70 corresponds to the light symbol sequence (011100), then point $p_1$ in the projection plane 30, 32 corresponds to the coordinate (row,colum)=(011,100)=(3,4) in the projection plane 30, 32.

Figure 7:
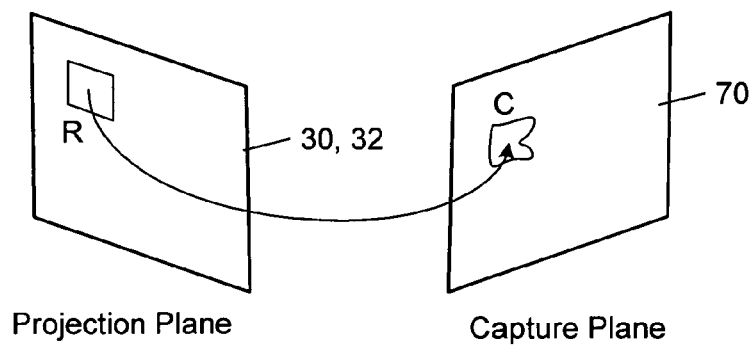
FIG. 7 is a diagrammatic view of an embodiment of a mapping of a centroid of a region in a projection plane to a corresponding centroid of a region in a capture plane.

There are different ways to resolve the many-to-many mapping problem to compute true point-to-point correspondences. Referring to FIG. 7, in some embodiments, the centroids of identified clusters in the camera's capture plane 70 are mapped to corresponding centroids of coordinate regions in the projection plane 30. The centroids may be computed using any one of a wide variety of known techniques. In one translational model approach, the correspondence mapping may be obtained as follows:

1. Compute the centroid $(u_c, v_c)$ and approximate dimensions $(w_c, h_c)$ of the current cluster C in a given capture plane.

2. Compute the centroid $(u_r, v_r)$ and approximate dimensions $(w_r, h_r)$ of the corresponding region R in the projection plane.

3. Map each point (u,v) in C to a new point in R given by $(w_c*(u-u_c)+u_r, w_r*(v-v_c)+v_r)$. That is, the distance the point in C is away from the centroid is determined and the mapping is scaled to fit within R.

In some embodiments, hierarchical ordering is used to introduce scalability to the correspondence results. In these embodiments, the lowest resolution patterns 52, 54 are first projected and decoded. This provides a mapping between clusters in the capture plane 70 to coordinate regions in the projection planes 30, 32. The above-described mapping algorithm may be applied at any resolution. Even if not all the light patterns are used, the best mapping between the camera 16 and the projectors 12, 14 may be determined by using this method, which helps to reduce the effect of spatial aliasing due to the patterns projecting at a much higher spatial frequency than the camera can capture for a given configuration. This mapping may be computed for every resolution, thereby creating a multiresolution set of correspondences. The correspondence mapping then may be differentially encoded to efficiently represent the correspondence. The multiresolution set of correspondences also may serve to validate the correspondence for every image pixel, since the correspondence results should be consistent across the resolutions.

In these embodiments, local smoothness may be enforced to ensure that the correspondence mapping behaves well. In some embodiments, other motion models (e.g. affine motion, splines, homography/perspective transformation) besides the translational model described above may be used to improve the coordinate mapping results.

Figure 8:
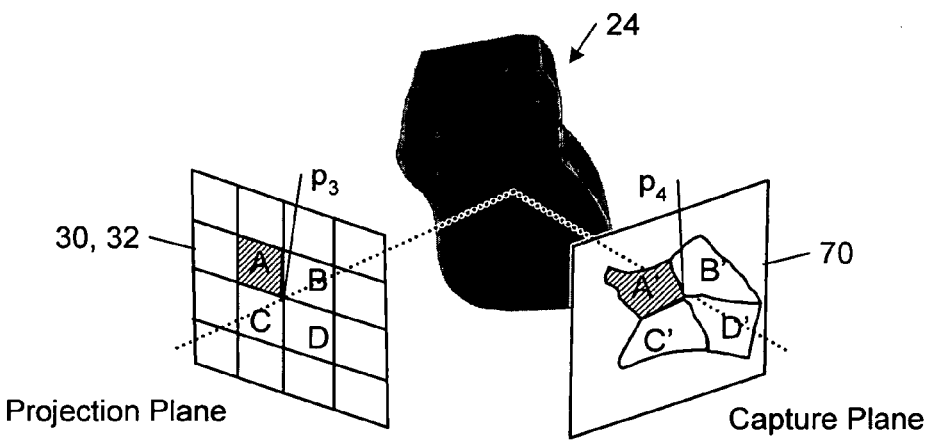
FIG. 8 is a diagrammatic view of an embodiment of a mapping of a corner point between regions of a projection plane to a corresponding corner point between corresponding regions of a capture plane.

FIG. 8 shows an embodiment of an alternative correspondence mapping approach in which corner points between regions in each projection plane are mapped to corresponding corner points between respective regions in a capture plane. In this embodiment, after decoding the sequence of light symbol patterns, the set of image points A' is assigned to rectangle A in the projection plane, however the exact point-to-point mapping remains unclear. Instead of mapping interior points, the connectedness of the projection plane rectangles is exploited to map corner points that border any four neighboring projection plane rectangles. For example, the corner point $p_3$ that borders A, B, C, D in the projection plane corresponds to the image point $p_4$ (the so-called imaged corner point) that borders A', B', C', D' in the capture plane 70.

Figure 9:
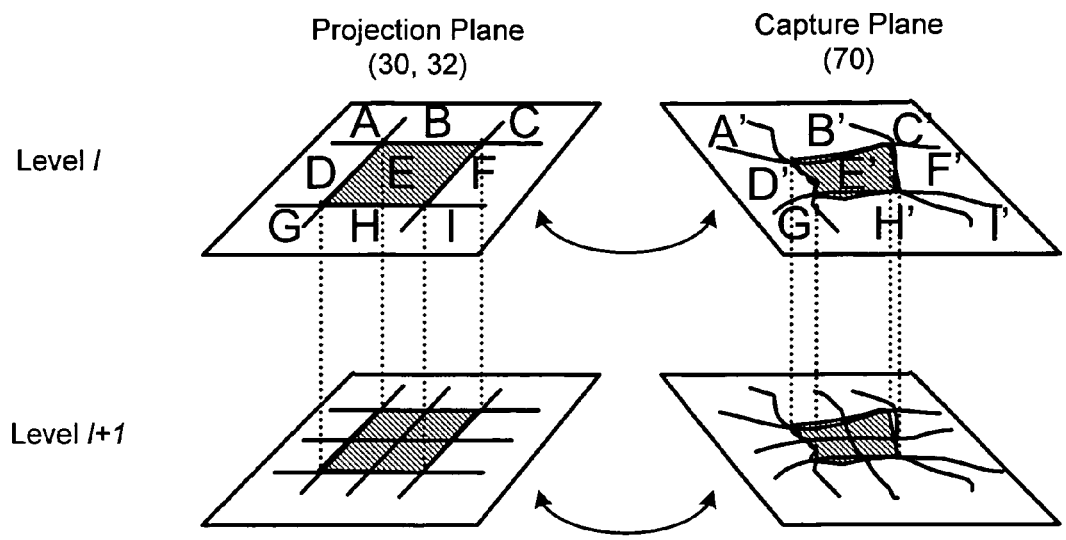
FIG. 9 is a diagrammatic view of an embodiment of multiresolution correspondence mappings between a projection plane and a capture plane.

Referring to FIG. 9, in some embodiments, since it may be difficult in some circumstances to locate every corner's match at the finest projection plane resolution, each corner's match may be found at the lowest possible resolution and finer resolutions may be interpolated where necessary. In the end, subpixel estimates of the imaged corners at the finest projection plane resolution are established. In this way, an accurate correspondence mapping from every projector 12, 14 to the capture plane 70 may be obtained, resulting in the implicit correspondence mapping among the pair of projectors 12, 14. In these embodiments, the following steps are performed:

1. Perform coarse-to-fine analysis to extract and interpolate imaged corner points at finest resolution of the projection plane. Define B(q) to be the binary map for the capture plane 70 corresponding to location q in the projection plane 30, 32 at the finest resolution, initially all set to 0. A projection plane location q is said to be marked if and only if B(q)=1. For a given resolution level l, the following substeps are performed for each projector 12, 14:

a. Convert bit sequences of each image point to the corresponding projection plane rectangle at the current resolution level. For all valid points p, the first l decoded symbols are decoded and used to determine the coordinate (c,r) in the $2^{l+1} \times 2^{l+1}$ projection plane. For example, in the case of binary light patterns, the corresponding column c is simply the concatenation of the first l decoded bits, and the corresponding row r is the concatenation of the remaining bits. Hence, $M_0(p)=(c,r)$.

b. Locate imaged corner points corresponding to unmarked corner points in the projection plane. Suppose valid point p in the capture plane 70 maps to unmarked point q in the projection plane. Then, p is an imaged corner candidate if there are image points within a 5×5 neighborhood that map to at least three of q's neighbors in the projection plane. In this way, the projection plane connectivity may be used to overcome possible decoding errors due to specularities and aliasing. Imaged corners are found by spatially clustering imaged corner candidates together and computing their subpixel averages. Set B(q)=1 for all corner points q at the current resolution level.

c. Interpolate remaining unmarked points in the projection plane at the current resolution level. Unmarked points with an adequate number of defined nearest neighbors are bilaterally interpolated from results at this or coarser levels.

d. Increment l and repeat steps a-c for all resolution levels l. The result is a dense mapping $M_0(\cdot)$ of corner points in the projection plane to their corresponding matches in the capture plane 70.

In other embodiments, different known corner detection/extraction algorithms may be used.

2. Validate rectangles in the projection plane. For every point (c,r) in the projection plane 30, 32, the rectangle with vertices {(c,r),(c+1,r), (c+1,r+1), (c,r+1)} is valid if and only if all its vertices are marked and they correspond to valid points in the capture plane 70.

Referring back to FIG. 4, after the captured light sequence codes have been determined (block 74), the computer 18 generates a correspondence mapping of the first projector plane 30 and the second projector plane 32 with respect to the reference coordinate system 36 based at least in part on correspondence between the captured light symbol sequence codes and the first and second sequences of light symbol patterns that are projected by the projectors 12, 14 (block 76). In some implementations, the reference coordinate system 36 is in the capture plane 70. In these implementations, the determined captured light symbol sequence codes are decoded into row and column positions to obtain the mapping between the camera 16 and each projector 12, 14. For a given projector 12, 14, the net result is a general dense point-to-point mapping between the camera pixels and the projector's coordinates. The decoding automatically identifies points that are in common to both the projectors 12, 14 and the camera 16 and, thereby, allows the visibility mask described above to be determined automatically.

In some implementations, the generalized correspondence mapping may be further reduced in size by fitting the point-to-point correspondence mapping to a model of the scene 24. For example, when working with the planar display surface 26 shown in FIG. 1, the mapping may be encapsulated in a single 3×3 planar perspective transformation (homography) $H_k=[h_{ki}]$ such that every camera pixel (u,v) relates to the projector k's coordinate $(x_k,y_k)$ by $$(x_k, y_k) = \left( \frac{h_{k1}u + h_{k2}v + h_{k3}}{h_{k7}u + h_{k8}v + h_{k9}}, \frac{h_{k4}u + h_{k5}v + h_{k6}}{h_{k7}u + h_{k8}v + h_{k9}} \right) \quad (1)$$

The homography $H_k$ may be directly computed using a least squares technique over the dense set of correspondence pairs. The coordinates also may be pre-scaled and post-scaled to ensure better conditioning.

In some other cases in which the scene 24 is better modeled by a curved or other non-planar surface, the point-to-point correspondence mapping may be fit to a higher order model, such as quadratic rational function, that imposes spatial coherence with the mapping results. In this case, the mapping is given by $$(x_k, y_k) = \left( \frac{h_{k1}u^2 + h_{k2}v^2 + h_{k3}uv + h_{k4}u + h_{k5}v + h_{k6}}{h_{k7}u^2 + h_{k8}v^2 + h_{k9}uv + h_{k10}u + h_{k11}v + h_{k12}}, \right. \\ \left. \frac{h_{k13}u^2 + h_{k14}v^2 + h_{k15}uv + h_{k16}u + h_{k17}v + h_{k18}}{h_{k19}u^2 + h_{k20}v^2 + h_{k21}uv + h_{k22}u + h_{k23}v + h_{k24}} \right) \quad (2)$$

An alternative function for dealing with general three-dimensional surfaces, including quadric surfaces, may be given by the mapping function $$(x_k, y_k) = \sum_{l=0}^{L} \sum_{m=0}^{M} h_{klm} u^l v^m \quad (3)$$

where L and M are integers. These mappings may be computed directly using a least squares technique to reduce noise.

The mappings defined in equations (1)-(3) may be applied between any pair of coordinate systems, including between any two projector's coordinate systems, between the capture plane of the camera and the projection plane of one of the projectors, and between the reference plane and the projection plane of one of the projectors.

In some implementations, the direct mapping between the coordinate systems of the two projectors 12, 14 is determined. In this regard, the projection plane 30, 32 of one of the projectors 12, 14 is selected to correspond to the reference coordinate system 36. The mappings between the projectors 12, 14 and the camera 16 are rewarped to eliminate the camera's coordinate system entirely. For the two projectors 12, 14 and the planar display surface 26, the interprojector mapping $F_{kl}$ is a homography based on the product of the homographies for the two projection planes, i.e., $F_{kl}=H_l H_k^{-1}$ or $$(x_l, y_l) = \left( \frac{f_{k1,1}x_k + f_{k1,2}y_k + f_{k1,3}}{f_{k1,7}x_k + f_{k1,8}y_k + f_{k1,9}}, \frac{f_{k1,4}x_k + f_{k1,5}y_k + f_{k1,6}}{f_{k1,7}x_k + f_{k1,8}y_k + f_{k1,9}} \right) \quad (4)$$

for all coordinates $(x_k, y_k)$ in the first projection plane and corresponding coordinates in the second projection plane $(x_l, y_l)$. In some implementations, the inverse mapping is first computed directly using least squares and then the component mappings are composed.

The resulting correspondence mapping may be used in any application that requires generation of a composite image from constituent images that are projected onto a scene from different viewpoints, including super-resolution and multi-tiled display applications.

In some embodiments, the projector images are pre-warped by recomputing the coordinates according to one of the above equations. Bilateral or bicubic interpolation may be used to resample the warped images and provide the best looking projector images. The prewarping may be sped up by storing the mapping in a lookup table and using an array of precomputed index pointers to the entries in the lookup table.

Other embodiments are within the scope of the claims.

Figure 10:
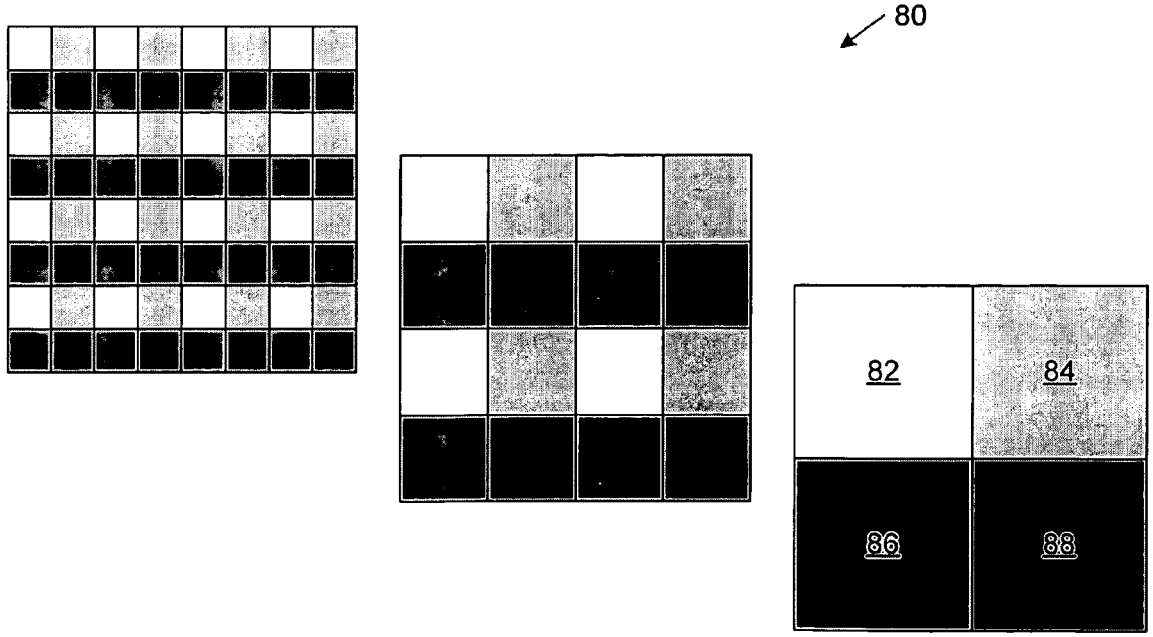
FIG. 10 is a diagrammatic view an embodiment of a set of multicolor light patterns.

The illustrated embodiments are described above in connection with the set of binary light symbol patterns 50. Other embodiments, however, readily may be used with sets of light symbol patterns consisting of more than two colors. For example, FIG. 10 shows an embodiment of a base-4 light symbol encoding approach that includes three light symbol patterns 80 that use four different colors (e.g., white 82, red 84, green 86, and blue 88) to encode both vertical and horizontal positions simultaneously. In this manner, only N base-4 images are required, where $N=\log_4(w\times h)$. The exemplary pattern shown in FIG. 10 encodes an 8×8 coordinate grid. The upper left location in the coordinate grid consists of (bright, bright, bright, bright, bright, bright) for the base-2 encoding of FIG. 5B and (white, white, white) for the base-4 encoding of FIG. 10. The location immediately to its right in the projection plane is (bright, bright, bright, bright, bright, dark) for base-2 and (white, white, red) in the base-4 encoding, and so forth for other locations. In this embodiment, reference patterns consist of all white, all red, all green, and all blue patterns.

Figure 11:
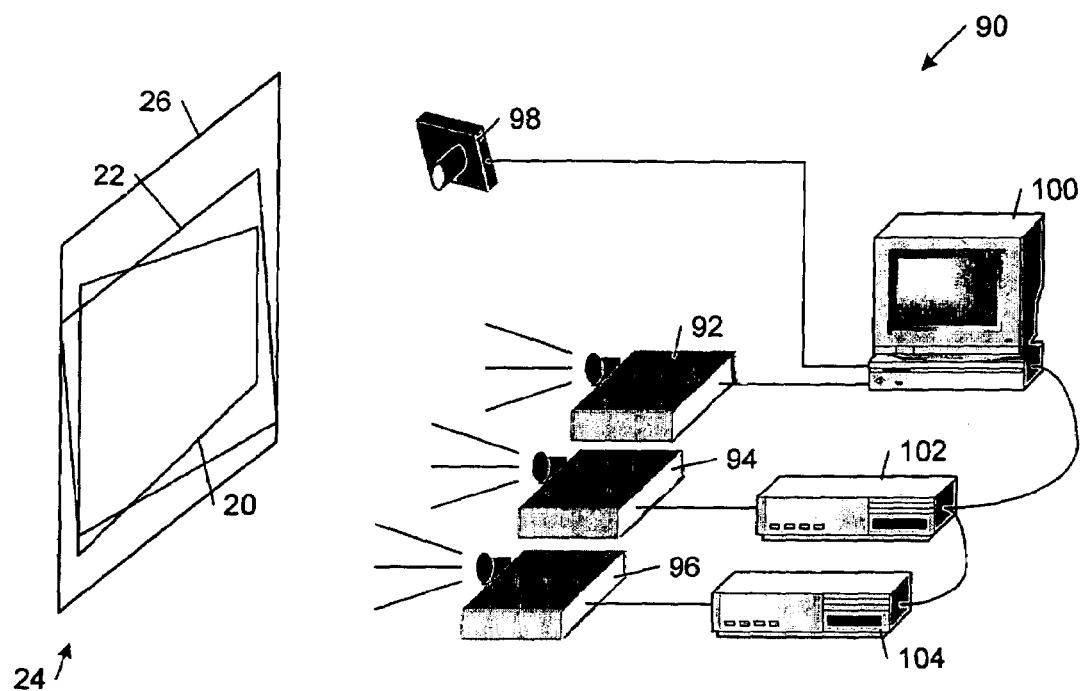
FIG. 11 is a diagrammatic view of an embodiment of a multi-projector system that includes three projectors, a camera, and three computer systems.

FIG. 11 shows an embodiment of a multi-projector system 90 that includes three projectors 92, 94, 96, a camera 98, and three computer systems 100, 102, 104. In this embodiment, the computer system 100 operates as a server processing unit that controls the operation of the imaging device 98 and the first projector 92. The computer systems 102, 104 operate as client processing units that control the operations of the second and third projectors 94, 96. The server and client computer systems 100, 102, 104 are configured in a network (e.g., a gigabit Ethernet network). Geometric calibration of the multi-projector system 90 is achieved in accordance with one or more of the methods described above. During the calibration process, however, the projection of light symbol patterns by the projectors 94, 96 is controlled by the client computer systems 102, 104, whereas the capture of images by the camera 98 is controlled by the server computer system 100. Therefore, in this embodiment, the operations of the client computer systems 102, 104 are synchronized with the operation of the server computer system 100 during calibration.

In some implementations, the corresponding image data that is captured by the camera 98 is passed from the server computer system 100 to the client computer systems 102, 104. Based on the image data captured by the camera 98, each of the server and client computer systems 100, 102, 104 generates a respective correspondence mapping between the capture plane and their respective projection planes. The client computer systems 102, 104 pass the client-generated correspondence mappings to the server computing system 100. The server computer system 100 additionally generates a correspondence mapping across the projection planes of all of the projectors 92, 94, 96 based on the server-generated and client-generated correspondence mappings in accordance with one or more of the methods described above. In some embodiments, these correspondence mappings may further be transformed to another reference coordinate system.

Figure 12:
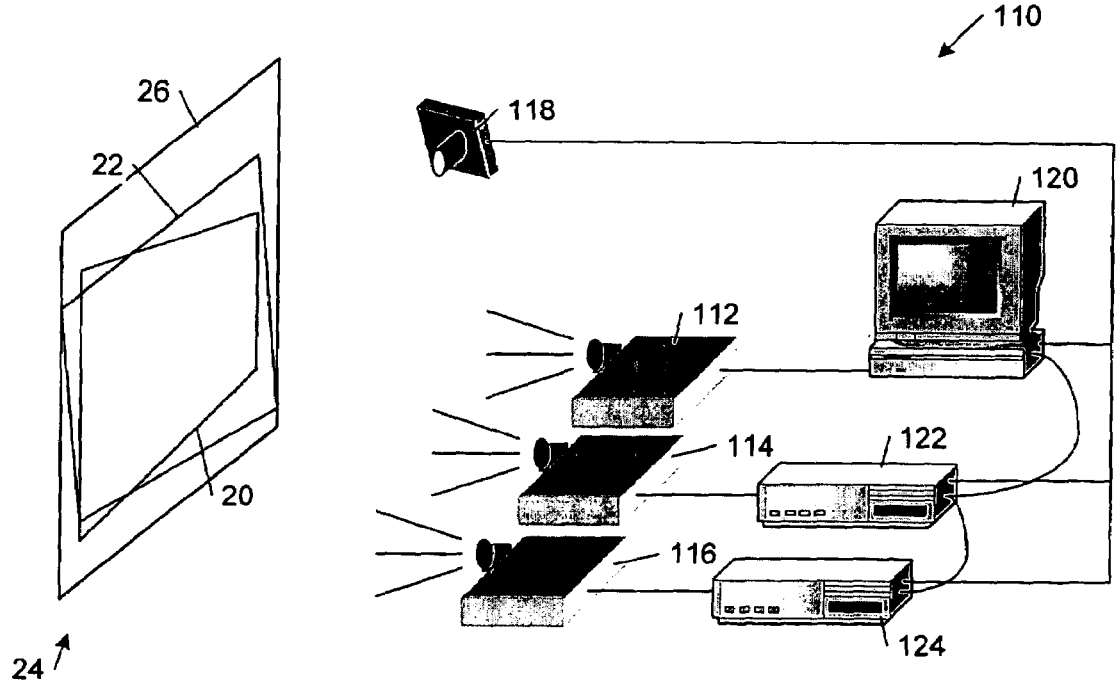
FIG. 12 is a diagrammatic view of an embodiment of a multi-projector system that includes three projectors, a camera, and three computer systems.

FIG. 12 shows another embodiment of a multi-projector system 110 that includes three projectors 112, 114, 116, a camera 118, and three computer systems 120, 122, 124. In this embodiment, the computer system 120 operates as a server processing unit that controls the operation of the imaging device 118 and the first projector 112. Each of the computer systems 122, 124 operate as a client processing unit that controls the operations of the camera 118 and a respective one of the second and third projectors 114, 116.

For example, in one implementation, the camera 118 is a Firewire-based camera 118 that is connected to a Firewire hub, which is connected to each of the computer systems 120, 122, 124. Alternatively, the Firewire connections to the camera 118 are cascaded and chained across the computer systems 120, 122, 124. Geometric calibration of the multi-projector system 110 is achieved in accordance with one or more of the methods described above. In particular, each of the computer systems 120, 122, 124 independently controls the projection of light symbols from a respective one of the projectors 112, 114, 116 and the capture of images by the camera 118. In this embodiment, the operations of the client computer systems 122, 124 need not be synchronized with the operation of the server computer system 120 during calibration. In addition, since each of the computer systems 122, 124 computes the respective correspondence mapping locally and passes only the resulting mapping data, network bandwidth requirements are reduced significantly relative to the embodiment shown in FIG. 11.

In some implementations, the corresponding image data that is captured by the camera 118 is passed from each of the client computer systems 122, 124 to the server computer system 120. Based on the image data captured by the camera 118, the server computer system 120 generates a respective correspondence mapping between the capture plane and the respective projection planes of the projectors 112, 114, 116 in accordance with one or more of the methods described above.

In some cases, the calibration between the cameras, projectors, and scene in the above-described embodiments may drift over time or the arrangements of these components may be changed. In these cases, one or more of the cameras, projectors or features of the scene may be re-configured and the above-described geometric calibration process may be repeated.

What is claimed is:

1. A method of multi-projector correspondence mapping, comprising:
projecting onto a scene a first sequence of patterns of light symbols that spatio-temporally encode two-dimensional position information in a first projection plane;
projecting onto the scene a second sequence of patterns of light symbols that spatio-temporally encode two-dimensional position information in a second projection plane;
capturing at a capture plane light patterns corresponding to the first and second sequences of patterns of light symbols reflected from the scene;
determining captured light symbol sequence codes from the captured light patterns; and
generating a correspondence mapping of the first projection plane and the second projection plane with respect to a reference coordinate system based at least in part on correspondence between the captured light symbol sequence codes and the first and second sequences of light symbol patterns.

2. The method of claim 1, wherein the first and second sequences of light symbol patterns are projected concurrently.

3. The method of claim 1, wherein the first and second sequences of light symbol patterns are projected consecutively.

4. The method of claim 1, wherein the first sequence of light symbol patterns is identical to the second sequence of light symbol patterns.

5. The method of claim 1, wherein among the projected light symbol patterns are light patterns respectively comprising different spatial variations of light.

6. The method of claim 1, wherein the generating comprises mapping corner points of light symbols captured in the capture plane to corresponding corner points of light symbols in the first and second projection planes.

7. The method of claim 1, wherein the generating comprises determining a point-to-point correspondence mapping between regions in the first projection plane and corresponding regions of the second projection plane.

8. The method of claim 7, wherein the generating comprises fitting the point-to-point correspondence mapping to a model of the scene.

9. The method of claim 1, wherein the scene is modeled by a planar surface and the correspondence mapping corresponds to a planar perspective transformation $H_k=[h_{hk}]$ such that points (u,v) in the reference coordinate system relate to coordinates $(x_k, y_k)$ in the $k^{th}$ projection plane by $$(x_k, y_k) = \left( \frac{h_{k1}u + h_{k2}v + h_{k3}}{h_{k7}u + h_{k8}v + h_{k9}}, \frac{h_{k4}u + h_{k5}v + h_{k6}}{h_{k7}u + h_{k8}v + h_{k9}} \right).$$

10. The method of claim 1, wherein the scene is modeled by a curved surface, and the correspondence mapping corresponds to a transformation $H_k=[h_{hk}]$ such that points (u,v) in the reference coordinate system relate to coordinates $(x_k, y_k)$ in the $k^{th}$ projection plane by $$(x_k, y_k) = \left( \frac{h_{k1}u^2 + h_{k2}v^2 + h_{k3}uv + h_{k4}u + h_{k5}v + h_{k6}}{h_{k7}u^2 + h_{k8}v^2 + h_{k9}uv + h_{k10}u + h_{k11}v + h_{k12}}, \right.$$
$$\left. \frac{h_{k13}u^2 + h_{k14}v^2 + h_{k15}uv + h_{k16}u + h_{k17}v + h_{k18}}{h_{k19}u^2 + h_{k20}v^2 + h_{k21}uv + h_{k22}u + h_{k23}v + h_{k24}} \right).$$

11. The method of claim 1, wherein the scene is modeled by a general three-dimensional surface, and the correspondence mapping corresponds to a transformation $H_{k=[hklm]}$ such that points (u,v) in the reference coordinate system relate to coordinates $(x_k, y_k)$ in the $k^{th}$ projection plane by $$(x_k, y_k) = \sum_{l=0}^{L} \sum_{m=0}^{M} h_{klm} u^l v^m$$

where L and M are integers.

12. The method of claim 1, further comprising, combining images projected from the first and second projection planes based at least in part on the correspondence mapping.

13. The method of claim 12, further comprising, before the combining, warping coordinates of the first projection plane to corresponding coordinates of the second projection plane based at least in part on the correspondence mapping.

14. The method of claim 13, further comprising storing the warped coordinates in a lookup table.

15. A machine-readable medium storing machine-readable instructions for causing a machine to perform operations comprising:
projecting onto a scene a first sequence of patterns of light symbols that spatio-temporally encode two-dimensional position information in a first projection plane;

projecting onto the scene a second sequence of patterns of light symbols that spatio-temporally encode two-dimensional position information in a second projection plane;

capturing at a capture plane light patterns corresponding to the first and second sequences of patterns of light symbols reflected from the scene;

determining captured light symbol sequence codes from the captured light patterns; and generating a correspondence mapping of the first projection plane and the second projection plane with respect to a reference coordinate system based at least in part on correspondence between the captured light symbol sequence codes and the first and second sequences of light symbol patterns.

16. The machine-readable medium of claim 15, wherein the machine-readable instructions cause the machine to perform operations comprising determining a point-to-point correspondence mapping between regions in the first projection plane and corresponding regions of the second projection plane.

17. The machine-readable medium of claim 16, wherein the machine-readable instructions cause the machine to perform operations comprising fitting the point-to-point correspondence mapping to a model of the scene.

18. The machine-readable medium of claim 15, wherein the scene is modeled by a planar surface, and the machine-readable instructions cause the machine to perform operations comprising generating a correspondence mapping corresponding to a planar perspective transformation $H_k=[h_{ki}]$ such that points (u,v) in the reference coordinate system relate to coordinates $(x_k,y_k)$ in the $k^{th}$ projection plane by $$(x_k, y_k) = \left( \frac{h_{k1}u + h_{k2}v + h_{k3}}{h_{k7}u + h_{k8}v + h_{k9}}, \frac{h_{k4}u + h_{k5}v + h_{k6}}{h_{k7}u + h_{k8}v + h_{k9}} \right).$$

19. The machine-readable medium of claim 15, wherein the scene is modeled by a curved surface, and the machine-readable instructions cause the machine to perform operations comprising generating a correspondence mapping corresponding to a transformation $H_k=[h_{ki}]$ such that points (u,v) in the reference coordinate system relate to coordinates $(x_k, y_k)$ in the $k^{th}$ projection plane by $$(x_k, y_k) = \left( \frac{h_{k1}u^2 + h_{k2}v^2 + h_{k3}uv + h_{k4}u + h_{k5}v + h_{k6}}{h_{k7}u^2 + h_{k8}v^2 + h_{k9}uv + h_{k10}u + h_{k11}v + h_{k12}}, \right.$$
$$\left. \frac{h_{k13}u^2 + h_{k14}v^2 + h_{k15}uv + h_{k16}u + h_{k17}v + h_{k18}}{h_{k19}u^2 + h_{k20}v^2 + h_{k21}uv + h_{k22}u + h_{k23}v + h_{k24}} \right)$$

20. The machine-readable medium of claim 15, wherein the scene is modeled by a general three-dimensional surface, and the correspondence mapping corresponds to a transformation $H_k=[h_{klm}]$ such that points (u,v) in the reference coordinate system relate to coordinates $(x_k,y_k)$ in the $k^{th}$ projection plane by $$(x_k, y_k) = \sum_{l=0}^{L} \sum_{m=0}^{M} h_{klm} u^l v^m$$

where L and M are integers.

21. A multi-projector system, comprising:
a first projector;
a second projector;
an imaging device; and
a processing system operable to
control the first projector to project onto a scene a first sequence of patterns of light symbols that spatio-temporally encode two-dimensional position information in a first projection plane,
control the second projector to project onto the scene a second sequence of patterns of light symbols that spatio-temporally encode two-dimensional position information in a second projection plane,
control the imaging device to capture at a capture plane light patterns corresponding to the first and second sequences of patterns of light symbols reflected from the scene,
determine captured light symbol sequence codes from the captured light patterns, and
generate a correspondence mapping of the first projection plane and the second projection plane with respect to a reference coordinate system based at least in part on correspondence between the captured light symbol sequence codes and the first and second sequences of light symbol patterns.

22. The system of claim 21, wherein the processing system is operable to control the first and second projectors to project light patterns respectively comprising different spatial variations of light.

23. The system of claim 21, wherein the processing system is operable to determine a point-to-point correspondence mapping between regions in the first projection plane and corresponding regions of the second projection plane.

24. The system of claim 23, wherein the processing system is operable to fit the point-to-point correspondence mapping to a model of the scene.

25. The system of claim 21, wherein the processing system comprises a server processing unit controlling operation of the imaging device and the first projector, and a client processing unit controlling operation of the second projector,
the client processing unit being operable to generate a client-generated correspondence mapping between the capture plane and the second projection plane and to pass the client-generated correspondence mapping to the server processing unit, and
the server processing unit being operable to generate the correspondence mapping of the first projection plane and the second projection plane with respect to the reference coordinate system based at least in part on the client-generated correspondence mapping.

26. The system of claim 21, wherein the processing system comprises a first processing unit controlling operation of the imaging device, a second processing unit controlling operation of the first projector, and a third processing unit controlling operation of the second projector,
the first processing unit passing image data corresponding to images captured by the imaging device to each of the second and third processing units,
the second processing unit being operable to generate a first correspondence mapping between the capture plane and the first projection plane based on the image data received from the first processing unit, and
the third processing unit being operable to generate a second correspondence mapping between the capture plane and the second projection plane based on the image data received from the first processing unit.

* * * * *

UNITED STATES PATENT AND TRADEMARK OFFICE
CERTIFICATE OF CORRECTION

PATENT NO.         : 7,306,341 B2                                       Page 1 of 1
APPLICATION NO.    : 11/068195
DATED              : December 11, 2007
INVENTOR(S)        : Nelson Liang An Chang It is certified that error appears in the above-identified patent and that said Letters Patent is hereby corrected as shown below:

In column 12, line 18, in Claim 9, delete "$[h_{hk}]$" and insert -- $[h_{ki}]$ --, therefor.

In column 12, line 28, in Claim 10, delete "$[h_{hk}]$" and insert -- $[h_{ki}]$ --, therefor.

In column 12, line 42, in Claim 11, delete "$[h_{hklm}]$" and insert -- $[h_{klm}]$ --, therefor.

Signed and Sealed this

Eighth Day of July, 2008

JON W. DUDAS
*Director of the United States Patent and Trademark Office*